July 24, 1928.
A. F. BARTLESON
1,677,912
METHOD OF COOKING AND APPARATUS USED IN SUCH METHOD
Filed Dec. 10, 1927
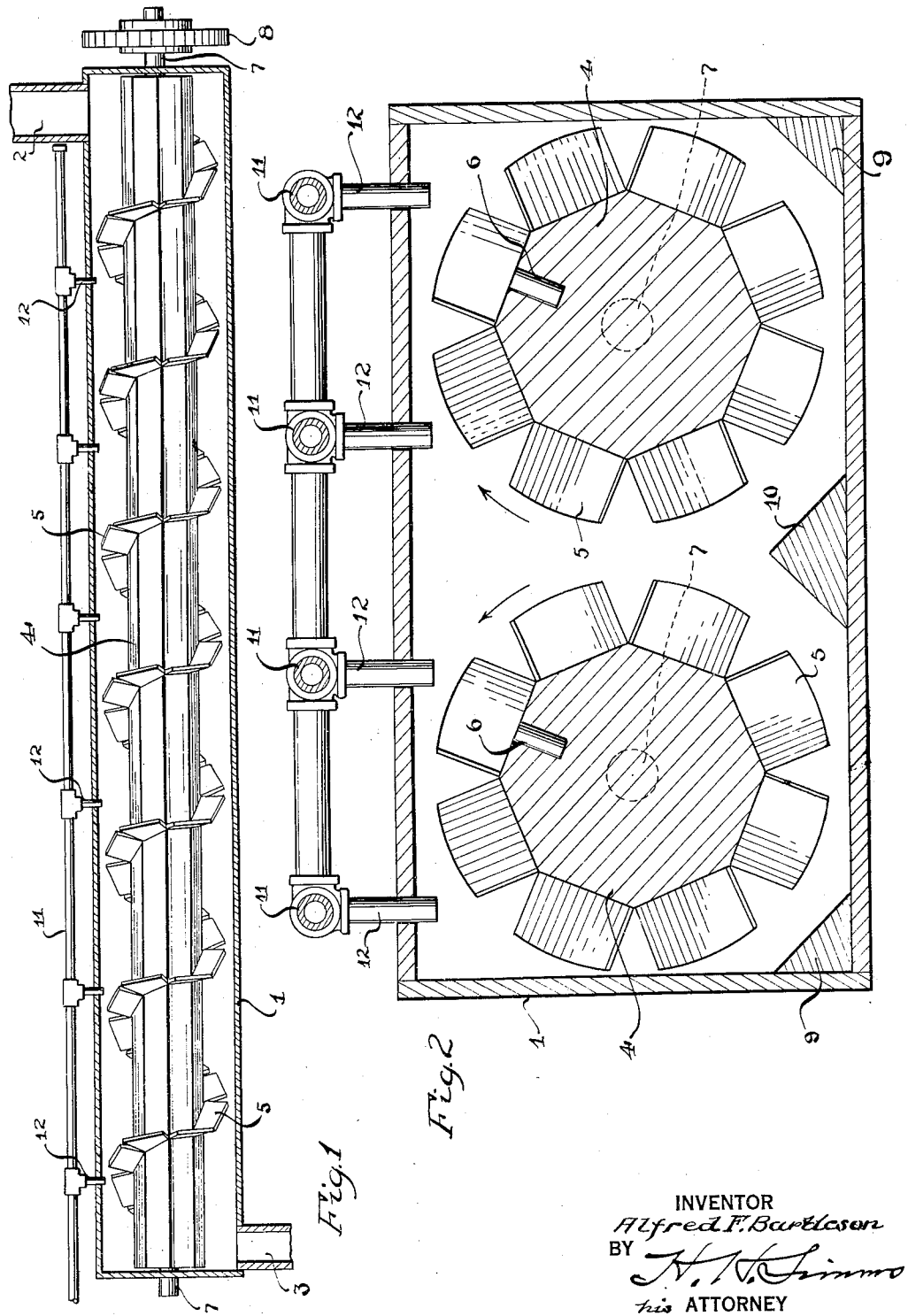
INVENTOR
Alfred F. Bartleson
BY
his ATTORNEY Patented July 24, 1928.

1,677,912

UNITED STATES PATENT OFFICE.

ALFRED F. BARTLESON, OF SODUS CENTER, NEW YORK, ASSIGNOR TO FRUIT BELT PRESERVING COMPANY, OF EAST WILLIAMSON, NEW YORK, A CORPORATION OF NEW YORK.

METHOD OF COOKING AND APPARATUS USED IN SUCH METHOD.

Application filed December 10, 1927. Serial No. 239,241.

The present invention relates to a method of cooking and to an apparatus used in such method, having more particular reference to that type of method and apparatus in which the material to be cooked is fed into one end of the cooking chamber and discharged from the other end, being subjected to the cooking action while passing from the inlet to the discharge. An object of this invention is to agitate the cooking mass in such a manner that steam may be fed to the agitated mass to produce a proper cooking action without discoloring the product.

To these and other ends, the invention consists of certain parts and combinations of parts, all of which will be hereinafter described: the novel features being pointed out in the appended claims.

In the drawings:

Fig. 1 is a longitudinal section through the machine; and

Fig. 2 is an enlarged transverse section.

In the illustrated embodiment of the invention 1 indicates an elongated cooking vat or receptacle which has an intake 2 at one end through which the material to be cooked is fed to the cooking vat, and a discharge 3 is at the opposite end of the vat. While the apparatus may be used for cooking any material, it is particularly adapted for cooking applesauce. When so used the apples preferably in a cut up condition and mixed with sugar if desired, are fed to the cooking chamber through the intake 3.

Within this cooking chamber are arranged two combined feeding and agitating members preferably both extending from the intake 2 to the discharge 3 and each comprising, in this instance, a drum 4 preferably of polygonal shape in cross section having blades 5 projected from its flat faces, said blades being arranged in a helical series. Each blade has a stem 6 which fits tightly in a bore of the drum 4 so that it may have its angle changed to vary the lifting action by blows upon the blade. Each drum has a shaft 7, provided with a gear 8, meshing with a like gear on the shaft 7 of the other drum and these gears are so driven that the shafts turn one clockwise, and the other counterclockwise, so that the blades of the two drums nearest to each other move upwardly, thus tending to lift the mass in the cooking chamber upwardly at the middle of said chamber. The blades also tend to move the mass from the intake to the discharge. Side cleats 9 and a central cleat 10 are provided in the cooking chamber so that no dead spaces will be formed in the bottom of the cooking chamber 1.

The cooking of the material is effected by directing jets of steam on the top of the agitated mass. In this instance, four longitudinal steam pipes 11 are arranged above the top of the cooking vat and from these pipes into the cooking chamber depend nozzles 12 at intervals throughout the length of the cooking utensil. These nozzles are arranged in four longitudinal series, two series being provided for each agitating drum; two series being situated on opposite sides of a drum so that that material which is lifted at the center of the cooking chamber is subjected to the steam jets while that material which is penetrated by the blades near the opposite sides of the cooking chamber is also submitted to the action of the steam jets.

With this invention, the cooking mass is brought into physical contact with the jets of steam through the lifting action of the feeding agitators. These agitators spread the material over the tops thereof and tend to subject the mass in thin layers to the steam so that the steam readily penetrates the material. In this way not so much steam is required and less condensation occurs in the mass.

The level of the material in the cooking chamber is maintained substantially in a horizontal plane with the uppermost portions of the polygonally formed surfaces of the drums. This causes the material to pass in thin layers over the drums toward the outer walls of the cooking chamber and tends to reduce the amount of material on the outer sides of the drums so that the steam can enter the mass at lower points on the outermost sides of the drums than in the space between the drums where it is lifted higher than the before mentioned horizontal plane.

What I claim as my invention and desire to secure by Letters Patent is:

1. The method of cooking which consists in moving a mass bodily through a cooking chamber, simultaneously lifting the middle portion of the mass upwardly, and subjecting the lifted portion of the mass to jets of steam.

2. A cooking apparatus comprising a cooking chamber having an intake at one end and a discharge at the opposite end, two combined feeders and agitators rotatably mounted in the cooking chamber to feed the mass from the intake to the discharge, means driving said feeders and agitators in opposite directions with their adjacent portions moving upwardly to lift the central portion of the mass, and means providing steam jets discharging on the lifted portion of the mass.

3. A cooking apparatus comprising a cooking chamber having an intake at one end and a discharge at the other, means feeding the material to be cooked from the intake to the discharge, and simultaneously lifting a portion of the mass toward the top of the cooking chamber, and means subjecting the lifting portion of the mass to the steam jets.

4. A cooking apparatus comprising a cooking chamber, two oppositely rotating feeding devices operating in said chamber to move the cooking mass from the intake to the discharge, said oppositely rotating member moving upwardly at their adjacent portions and lifting the middle portion of the mass in the cooking chamber upwardly, and four series of steam jets, two of the said series being arranged on opposite sides of the axis of rotation of each of said feeding members.

ALFRED F. BARTLESON.